United States Patent [19]

Bertoglio et al.

[11] 4,192,972
[45] Mar. 11, 1980

[54] PAY-TELEPHONE STATION WITH DEFERRED COLLECTION

[75] Inventors: Ottavio Bertoglio; Aurelio Caccia; Riccardo Fidanza, all of Turin; Wouter M. D. VanVeen, San Maurizio Canavese, all of Italy

[73] Assignee: Cselt-Centro Studi e Laboratori Telecomunicazioni S.p.A, Turin, Italy

[21] Appl. No.: 964,339

[22] Filed: Nov. 28, 1978

Related U.S. Application Data

[63] Continuation-in-part of Ser. No. 788,757, Apr. 19, 1977, abandoned.

[30] Foreign Application Priority Data

Apr. 27, 1976 [IT] Italy .................. 68016 A/76

[51] Int. Cl.$^2$ ........................................ H04M 17/02
[52] U.S. Cl. ............................ 179/6.3 R; 194/1 N
[58] Field of Search ............... 179/6.3 R, 6.4, 6.5; 194/1 D, 1 H, 1 N

[56] References Cited

U.S. PATENT DOCUMENTS

| | | | |
|---|---|---|---|
| 3,820,642 | 6/1974 | Levasseur | 194/1N |
| 3,841,456 | 10/1974 | Levasseur | 194/1 N |
| 4,028,494 | 6/1977 | Zarouni | 179/6.3 R |
| 4,034,839 | 7/1977 | Lee | 194/1 N |
| 4,105,867 | 8/1978 | Levasseur et al. | 179/6.3 R |

FOREIGN PATENT DOCUMENTS

| | | | |
|---|---|---|---|
| 1437554 | 10/1968 | Fed. Rep. of Germany | 179/6.3 R |
| 2037671 | 7/1970 | Fed. Rep. of Germany | 179/6.3 R |
| 2247340 | 4/1974 | Fed. Rep. of Germany | 179/6.3 R |

OTHER PUBLICATIONS

"The New Coin Box Set Az 44", *Hasler Review* vol. 9, No. 2 pp. 51-56, Surmer 1976, A. Nyffenger.

*Primary Examiner*—Gerald L. Brigance
*Attorney, Agent, or Firm*—Karl F. Ross

[57] ABSTRACT

A pay-telephone station equipped to handle local and long-distance calls includes a microcomputer which, at the end of a conversation or under certain conditions during a call, selectively collects predeposited payment items (coins, bills and/or prepayment entries of subscription cards) of different denominations calculated according to the debt incurred and to the denominations available to optimize the refunding of any excess to a user. The microcomputer also determines, upon the start of dialing by a caller, whether the initial deposit suffices for at least the basic charge on the type of connection (local or trunk call) sought to be set up and, if it does not, invites the user to make an additional deposit before aborting the call. The remaining credit balance is continuously signaled to the caller on a display unit and, even before actual collection, is diminished according to the applicable rate in response to each metering pulse arriving from the exchange.

12 Claims, 9 Drawing Figures

TOTAL DEPOSIT: $59.70

| PAYMENT DENOMINATION / DEPOSIT | $25.00 | $10.00 | $5.00 | $2.50 | $1.00 | $0.25 | $0.10 | $0.05 |
|---|---|---|---|---|---|---|---|---|
| ONE UNIT | X | X | O | O | X | X | X | X |
| TWO UNITS | O | X | O | O | X | X | O | X |
| THREE UNITS | O | X | O | O | X | O | O | O |
| FOUR UNITS | O | O | O | O | X | O | O | O |

FIG. 7

DEBT: $33.45

| TRIAL DENOMINATION / CALCULATION | $25.00 | $10.00 | $5.00 | $2.50 | $1.00 | $0.25 | $0.10 | $0.05 | DIFFERENTIAL (TT−DR) |
|---|---|---|---|---|---|---|---|---|---|
| 1st TRIAL | 1 | 1 | 0 | 0 | 0 | 0 | 0 | 0 | +1.55 |
| 2nd TRIAL | 1 | 0 | 0 | 0 | 4 | 2 | 1 | 2 | (−3.75) |
| 3rd TRIAL | 0 | 3 | 0 | 0 | 4 | 0 | 0 | 0 | +0.55 |
| 4th TRIAL | 0 | 3 | 0 | 0 | 3 | 2 | 0 | 0 | +0.05 |
| 5th TRIAL | 0 | 3 | 0 | 0 | 3 | 1 | 1 | 2 | 0 |

FIG. 8

DEBT: $24.83

| TRIAL DENOMINATION / CALCULATION | $25.00 | $10.00 | $5.00 | $2.50 | $1.00 | $0.25 | $0.10 | $0.05 | DIFFERENTIAL (TT−DR) |
|---|---|---|---|---|---|---|---|---|---|
| 1st TRIAL | 1 | 0 | 0 | 0 | 0 | 0 | 0 | 0 | +0.15 |
| 2nd TRIAL | 0 | 3 | 0 | 0 | 0 | 0 | 0 | 0 | +6.15 |
| 3rd TRIAL | 0 | 2 | 0 | 0 | 4 | 2 | 1 | 2 | (−0.15) |
| 4th TRIAL | | | | | | | | | |
| | | | | | | | | | |

FIG. 9

PAY-TELEPHONE STATION WITH DEFERRED COLLECTION

CROSS-REFERENCE TO A RELATED APPLICATION

The present application is a continuation-in-part of our copending patent application Ser. No. 788,757 filed Apr. 19, 1977 and now abandoned.

FIELD OF THE INVENTION

Our present invention relates to pay telephones facilitating the establishment of both local and long-distance connections.

BACKGROUND OF THE INVENTION

With the continuing increase of telephone traffic, telephone companies are attempting to make direct international or intercontinental dialing available to the users of pay telephones which at present are rather ill-suited for this type of service, being able to handle only coins up to a certain monetary value (usually 25 cents in the United States). Thus, a user would have to provide himself with a large number of tokens or coins of equivalent denomination unless pay stations were designed to handle denominations of higher value in the form of, say, paper money and/or prepayment credits on subscription cards. With these higher-valued payment items, however, there arises the problem of properly settling the incurred dept from the deposited funds without overcharging a caller who, usually, has no advance knowledge of the exact cost of the call and must therefore make available an excess amount to prevent premature cutoff. If the system were to accept, for example, one-dollar items in the form of coins, bills or tokens, and if the user deposits two such items for a call actually costing only $1.05, he would lose the excess payment of 95 cents; lower-valued coins, on the other hand, would be rapidly consumed on connections over larger distances and could not be fed in fast enough to keep up with the demand without unduly distracting the attention of the caller from the conversation in which he is engaged.

OBJECTS OF THE INVENTION

The general object of our present invention is to provide a pay-telephone station with means for accepting payment in a wide variety of denominations and for deferring the actual collection of at least a significant part of the deposited payment items to ensure a maximum refund of unspent money to the user.

A more specific object is to extend this principle to a plurality of payment acceptors accommodating different types of monetary media such as coins or tokens, bills and prepayment cards.

A further object is to enable a caller, after termination of a talking connection but prior to final collection, to deposit additional payment items for minimizing or eliminating any nonrefundable surplus.

SUMMARY OF THE INVENTION

Our invention is applicable to any telephone pay station having the usual voice-communication equipment and selection means—preferably a keyboard—for transmitting call-number digits to an associated exchange preparatorily to the establishment of a talking connection to a remote subscriber. The station further comprises one or more payment acceptors accommodating deposits of monetary media, such as coins, tokens, bills and/or subscription cards, including payment items of different denominations. Each payment acceptor is provided with sensing means for detecting the number of deposited payment items of each denomination, as well as with money-handling means for selectively collecting payment items of any denomination and refunding uncollected payment items to the user. The sensing and money-handling means coact with computing means including a processor which controls the collection of deposited payments in response to metering pulses from the exchange and for refunding any remaining balance to the user upon the termination of a talking connection, there being of course no refund when that connection is cut off upon exhaustion of the deposited amount. For this purpose, the processor comprises first register means for storing a debt accumulated from charges based on the incoming metering pulses, second register means controlled by the aforementioned sensing means for storing the number of deposited items on any denomination, disconnect means for cutting off the talking connection when the debt stored in the first register means reaches the sum of the monetary values of the deposited payment items, logical circuitry operative upon a termination of a talking connection (other than through cutoff by the disconnect means) for establishing different subcombinations of the contents of the second register means, and an arithmetic unit connected to the logical circuitry for calculating the difference between the accumulated debt and the total value of the payment items represented by any of these subcombinations. A subcombination for which this total value falls short of the debt will be discarded; one whose total value exactly matches the debt will be considered an optimum and will give rise to signals under the control of the arithmetic unit for actuating the money-handling means to collect precisely the payment items which make up that optimum subcombination while refunding the balance of the deposit. In many instances, however, the logical circuitry will first carry out one or more trial calculations establishing subcombinations whose total value exceeds the debt by a surplus which would be nonrefundable if collection on the bases thereof were actually carried out; the arithmetic unit, therefore, chooses as the optimum subcombination the one for which that surplus is either zero or at most equal to the surplus obtained from any other such subcombination.

In a preferred embodiment more fully described hereinafter, the processor further comprises third register means for temporarily storing a set of tentative counts of deposited payment items representing one of the subcombinations referred to, fourth register means for receiving the contents of the third register means upon identification thereof as a representation of the optimum subcombination, fifth register means for temporarily marking a stage of the third register means as dominant in the sense that higher-ranking stages will not be considered in the establishment of a new subcombination, and sixth register means for storing the surplus resulting from any subcombination for comparison with a possible surplus from a subsequently established subcombination.

The payment acceptors envisaged by us include coin and bill handlers as well as subscription-card readers. As far as the processor is concerned, however, only the denominations of the payment items deposited in any of these devices are significant. The term "collecting" means a physical ingathering in the case of tokens or currency (coins and bills) or a cancellation of prepayment credits on a subscription card.

Another advantageous feature of our invention resides in the provision of warning means, controlled by the arithmetic unit, for alerting the user to an impending cutoff upon approaching exhaustion of the deposited funds.

Pursuant to a further feature, we provide display means connected to the processor for visually indicating to the user the accumulated debt and the deposited monetary values along with the diminishing credit balance throughout the existence of a talking connection. In certain instances to be discussed, the processor may signal the money-handling means to collect a highest-denomination deposited payment item prior to termination of the connection; while this will result in a corresponding reduction of the contents of the first and second register means referred to above, it need not change the displayed amounts so that the user will always be aware of the total cost of the call. We also prefer to delay the operation of the logical circuitry after termination of a call to give the user a chance to make an additional deposit which would further reduce or eliminate the nonrefundable surplus; such delay may be brought about by the provision of a special request button, to be pushed by the user for initiating a settlement, in combination with timing means for letting the trial calculations take their course after a certain waiting period unless the user decides to place another call.

BRIEF DESCRIPTION OF THE DRAWINGS

The above and other features of our invention will now be described in detail with reference to the accompanying drawing in which.

SPECIFIC DESCRIPTION

Figure 1:
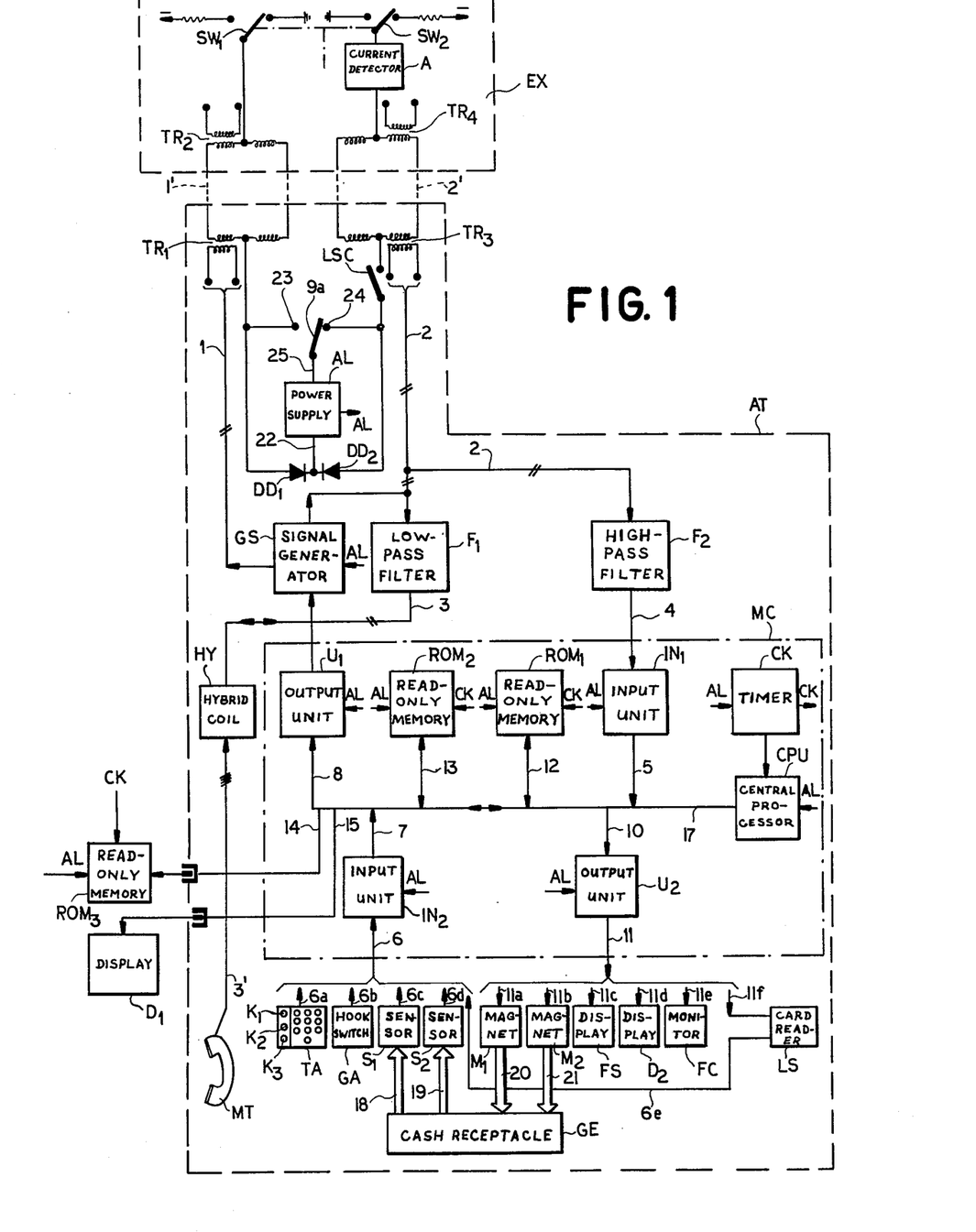
FIG. 1 is a block diagram of a pay-telephone station according to our present invention.

As illustrated in FIG. 1, a pay-telephone station AT according to our present invention comprises a microcomputer MC controlling the collection of coins, bills and/or tokens from a cash receptacle GE and credit units from a subscription card SC (FIG. 3) inserted in a reader LS, such collection occurring in response to charging pulses received from an exchange EX via a talking loop 2 and a high-pass filter $F_2$. Microcomputer MC transmits to exchange EX via an outgoing loop 1 and a signal generator GS information concerning the reception of charging pulses from the exchange, the type of telephone call (i.e. whether trunk or local) and the collection of payments from receptacle GE and card reader LS. Voice-frequency-coded digits selected through use of a largely conventional keyboard TA are emitted by signal generator GS on loop 2 under the control of the microcomputer MC. In addition to further supervisory and control signals, loop 2 carries speech signals between exchange EX and a low-pass filter $F_1$ connected by a lead 3 to a hybrid coil HY which is in turn linked to a handset MT via a four-wire line 3'.

Loops 1 and 2 are connected to the primary windings of a pair of transformers $TR_1$ and $TR_3$ whose secondary windings extend via lines 1' and 2' to two other transformers $TR_2$, $TR_4$ in exchange EX, the primary windings of these transformers being tied to conventional logic circuits (not shown) in the exchange. Central taps of transformers $TR_2$, $TR_4$ are alternately connectable to ground and to negative voltage by ganged switches $SW_1$, $SW_2$ controlled by a current detector A which is inserted between the midpoint of the line-side winding of transformer $TR_4$ and switch $SW_2$; the midpoints of the line-side windings of transformers $TR_1$, $TR_3$ are connected by way of respective diodes $DD_1$, $DD_2$ to a first input 22 of a voltage generator AL, powered by currents from the exchange, and via respective contacts 23, 24 and a contact ga to a second input 25 of this local power supply, contact ga reproducing under the control of microprocessor MC the movements of a hook switch GA. A normally closed contact LSC disposed between the central tap of transformer $TR_3$ and the inputs of power supply AL is opened by a nonillustrated voltage sensor in case the energy stored in a rechargeable battery of that supply is insufficient for the operation of microcomputer MC, the interruption in current flow in the loops constituting an alarm signal to the exchange.

During a rest or quiescent phase of a pay station according to our present invention, current flows from ground through switch $SW_1$ and diode $DD_1$ to power supply AL and thence through contact ga and switch $SW_2$ to the negative-voltage source in exchange EX. Upon the opening of hook switch GA prior to the establishment of a telephone connection, contact ga is reversed by microcomputer MC to connect the secondary winding of transformer $TR_1$ to input 25 of power supply AL, whereby current is prevented from flowing from exchange EX to supply AL via diode $DD_1$. Current sensor A, on being thus de-energized, reverses the switches $SW_1$ and $SW_2$, thereby establishing a current path from ground through switch $SW_2$ and diode $DD_2$ to power supply AL and from there over contact ga, line 1' and switch $SW_1$ to the negative-voltage source.

It is to be noted that information is transmitted toward exchange EX in the form of multifrequency signals on loop 1 or in the form of voice-frequency signals on loop 2; the signals sent toward the pay station are interruptions in the flow of current on the loops or, in the case of metering pulses, bursts of high-frequency oscillations (teletax signals). If exchange EX is not equipped to handle voice-frequency coding of selected digits, microcomputer MC oscillates the contact ga at a rate which the switches $SW_1$ and $SW_2$ cannot follow to generate pulse trains which are interpreted by exchange EX as dialing signals corresponding to the pushbuttons depressed on keyboard TA.

Microcomputer MC comprises a central processing unit CPU, a clock or timer CK, two input units $IN_1$ and $IN_2$, two output units $U_1$ and $U_2$, and two read-only memories $ROM_1$ and $ROM_2$. Input unit $IN_1$, tied to filter $F_2$ by a lead 4 and to a bus 17 of microcomputer MC by a lead 5, converts a-c signals arriving on lead 4 into binary signals having a voltage level utilizable by the units of the microcomputer. Read-only memory $ROM_1$, connected to bus 17 by a bidirectional multiple 12, stores the programs executed during the operation of microcomputer MC while memory $ROM_2$, which is connected to bus 17 via a bidirectional multiple 13, stores information relating to the numerical values of various denominations of currency usable in the pay station. Memory $ROM_2$ also contains charging rates for local and trunk or long-distance calls, this information being used by the processor for selectively weighting the metering pulses received from exchange EX via loop 2 and high-pass filter $F_2$, as described more fully hereinafter. Another read-only memory $ROM_3$ can be plugged into bus 17 via a multiple 14 for conducting supervisory and diagnostic operations on microcomputer MC. A display unit $D_1$ used in conjunction with memory $ROM_3$ is connectable to bus 17 via a multiple 15 and includes various registers for temporarily storing data concerning the operation of processor CPU.

The processor transmits information to signal generator GS via bus 17, a lead 8, output unit $U_1$ and another lead 9. Digits constituting a selected telephone number are coded by generator GS as voice-frequency signals emitted on loop 2 toward exchange EX, while other information regarding, for example, the collection of coins by station AT is coded by generator GS as multifrequency signals produced on loop 1. Further messages emitted on loop 1 by generator GS in response to signals from microcomputer MC serve for announcing the impending transmission of call-number digits, acknowledging the reception of metering pulses from the exchange and reporting the occurrence of faults or malfunctions.

Keyboard TA and hook switch GA are respectively tied via conductors 6a and a lead 6b, forming part of a multiple 6, to input unit $IN_2$ which is in turn connected to bus 17 by a lead 7. A sensor $S_1$ operatively coupled with cash receptacle GE, as indicated by a hollow arrow 18, monitors the number of payment items (coins, tokens and/or bills) temporarily stored in the cash receptacle and works into input unit $IN_2$ via conductors 6c also forming part of multiple 6. Another sensor $S_2$, with output leads 6d of multiple 6 extending to input unit $IN_2$, monitors the cash receptacle GE, as schematically indicated by a hollow arrow 19, and signals to microcomputer MC the collection of a payment item by the station. Besides the usual keys for digit selection, keyboard TA may also be provided with additional keys $K_1$ for emergency calls, $K_2$ for the repetition of a previously selected call number and $K_3$ for settlement demands from the user, as described more fully hereinafter.

Card reader LS, to be presently described in detail with reference to FIG. 3, has output leads 6e working into input unit $IN_2$ and input leads 11f included in a multiple 11, extending from output unit $U_2$ which is connected via a lead 10 to bus 17. Output multiple 11 of unit $U_2$ further includes a pair of leads 11a, 11b extending to respective magnets or solenoids $M_1$, $M_2$ controlling the collection and refund of currency in cash receptacle GE, as schematically indicated by hollow arrows 20, 21. A sound generator FS, tied to output unit $U_2$ by means of a lead 11c also included in multiple 11, informs a user of defects rendering station AT inoperative, e.g. impaired coin collection, a fully loaded or missing cash receptacle, a failing power supply or a malfunction of clock CK. A second display unit $D_2$ is linked to output unit $U_2$ by a lead 11d of multiple 11 and serves to visualize such numerical data as the debt incurred, the remaining credit balance and, possibly, the monetary value of the highest-ranking payment item stored in receptacle GE or available on a subscription card inserted in reader LS. This information is updated by microcomputer MC upon the reception of a metering pulse from exchange EX and upon the insertion of additional currency in the receptacle. A warning device FC, with an input lead 11e also included in multiple 11, serves for acoustically alerting a user to the imminent dissipation of the credit balance; in addition, or instead, a visual indicator such as a flashing light may be used for this purpose in display unit $D_2$. The various units of microcomputer MC receive power from supply AL, as diagrammatically indicated; memories $ROM_1$, $ROM_2$ and processor CPU receive synchronizing clock signals from timer CK.

Cash receptacle GE may be divided into two parts, i.e. a first section or coin box GE' (FIG. 2) for the temporary storage and collection of coins and possibly tokens and a second section (not further illustrated) for accepting folding money, this latter section comprising a conventional bill scanner monitored by sensors $S_1$ and $S_2$ for registering the number and types of bills deposited by a user and collected by the apparatus, respectively. The collection and refunding procedures for bills is analogous to that used for coins as more fully described hereinafter. The bill scanner may comprise several parallel conveyors for accepting paper money of different denominations, e.g. as described in U.S. Pat. No. 4,087,858.

Figure 2:
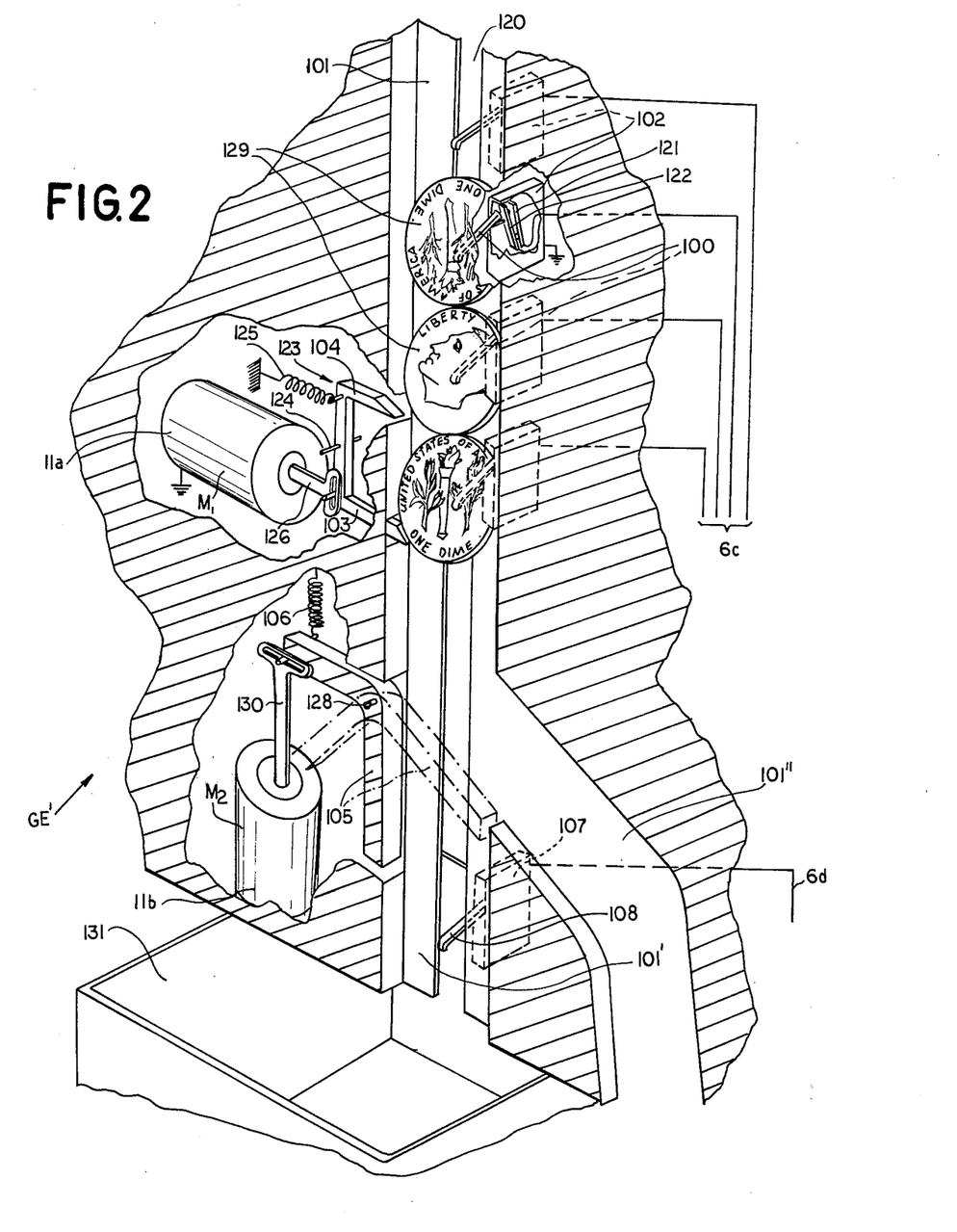
FIG. 2 is a partial cross-sectional view of a coin box illustrated schematically in FIG. 1.

As illustrated in FIG. 2, coin box GE' includes a chute 101 for each denomination of coins or tokens handled by station AT. (For accounting purposes, the conveyors of the bill scanner will be considered additional chutes.) A plurality of sensitive switches 102, forming part of sensor $S_1$, have respective levers 100 traversing slot 120 in chute 101 for actuation by coins 132 descending in the chute to close pairs of contacts 121, 122, thereby energizing respective conductors 6c. A generally C-shaped detent 123 for temporarily holding coins in chute 101, with lower and upper arms 103, 104, is pivotable about a mounting pin 124 through the interaction of a restoring spring 125 and solenoid $M_1$. Upon the energization of this solenoid by way of lead 11a from microprocessor MC, its core 126 rocks the detent 123 to withdraw its lower arm 103 from chute 101 while simultaneously extending its upper arm 104, thereby allowing exactly one coin to fall from the stack stored in the chute. Upon the re-energization of solenoid $M_1$, spring 125 retracts arm 104 from chute 101 and re-extends arm 103, the stack of coins 129 left in the chute descending by one coin to come to rest on lower arm 103. Below detent 123, chute 101 divides into two branches 101', 101", branch 101' leading to depository 131 whereas branch 101" opens into a refund cup (not shown). A generally L-shaped baffle 105 is pivotable about a mounting pin 128 for diverting falling coins from branch 101' to branch 101" whenever microprocessor MC, via lead 11b, energizes the solenoid M$_2$ whose core then swings that baffle from its solid-line position into its phantom-line position against the force of a restoring spring 106. Another sensitive switch 107, forming part of sensor S$_2$, has a feeler 108 transversing the slot 120 in chute branch 101' for temporarily energizing, upon passage of a coin through that branch, one of the output leads 6d of that sensor.

With chutes accommodating up to four coins, five sustained bit patterns can be transmitted over leads 6c to microcomputer MC, namely, 0000, 0001, 0011, 0111, 1111, according to whether there are zero, one, two, three or four coins held by arm 103 in chute 101. Other bit patterns, such as 1001 or 1011, lasting longer than a predetermined period will be interpreted by processor CPU as a sign of malfunction.

Figure 3:
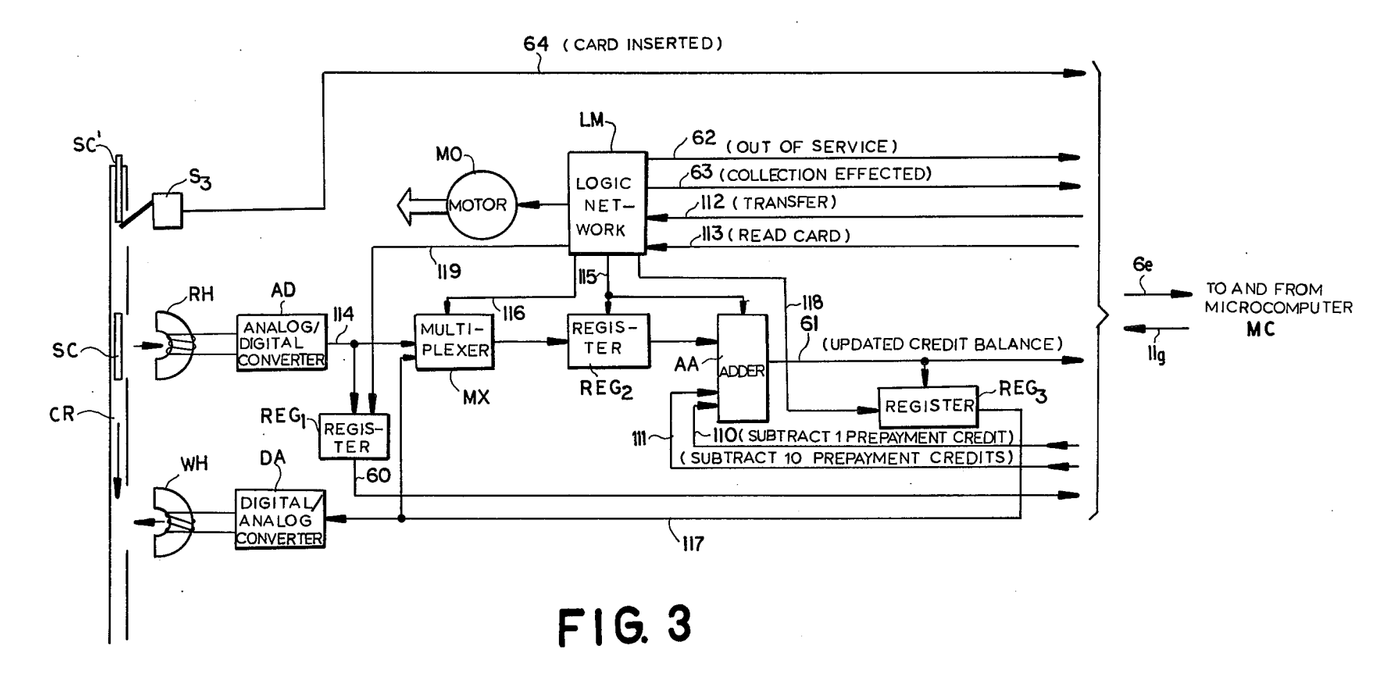
FIG. 3 is a block diagram of a subscription-card reader shown schematically in FIG. 1.

In FIG. 3 we have shown the card reader LS as comprising a reading head RH connected to an analog/digital converter AD with an output lead 114 extending to a multiplexer MX and to a register REG$_1$. This register has an output lead 60 forming part of outgoing conductor group 6e. Multiplexer MX feeds another register REG$_2$ working into an algebraic adder AA which has further input leads 110, 111 extending from output units U$_2$ as part of conductor group 11f and another input lead 115 extending from a logic network LM. The latter, communicating with microcomputer MC via outgoing and incoming leads 62, 63 and 112, 113 which are included in conductor groups 6e and 11f (see FIG. 1), has another output lead 116 terminating at multiplexer MX for controlling its switching operations and a further output lead 115 feeding register REG$_2$ as well as adder AA. This adder has an output lead 61, forming part of group 6e and extending to another register REG$_3$ working via an output lead 117 into multiplexer MX and into a digital/analog converter DA which is connected to writing head WH. Register REG$_3$ has a reading input linked directly to logic network LM by a lead 118. Network LM controls a motor MO for successively transporting a magnetic subscription card SC along a guide channel CR past the reading and writing heads RH, WH. Upon the insertion of subscription card SC into channel CR, a sensor S$_3$ similar to the switches 102 shown in FIG. 2 emits a signal to microcomputer MC on a lead 64. A reading command subsequently generated by the microcomputer on lead 113 causes a temporary activation of motor MO by logic network LM whereby subscription card SC is conveyed past reading head RH and the number of prepayment credits recorded on the card is transmitted in digitally coded form to registers REG$_1$ and REG$_2$ by converter AD and multiplexer MX. During the reading of subscription card SC by head RH, network LM switches the output of multiplexer MX to lead 114. Upon receiving a transfer command from microcomputer MC on lead 112, logic network LM energizes lead 115, thereby reading from register REG$_2$ to adder AA the number of prepayment credits entered on card SC. Lead 110, when energized by a collection command, induces adder AA to subtract one prepayment credit from the total originally available on the card, whereas a similar command on lead 111 causes the subtraction of ten prepayment credits. The result of the operation of adder AA is transmitted to microcomputer MC and to register REG$_3$ over lead 61. Having changed the voltage level on lead 116, logic network LM energizes lead 118, thereby causing the transfer of the reduced number of credits from register REG$_3$ to register REG$_2$ via lead 117 and multiplexer MX for a possible repetition of the operation in response to another collection command. Network LM notifies microcomputer MC of completed collection operations by emitting a signal on lead 63.

Upon the termination of a telephone conversation, microcomputer MC again induces logic network LM to actuate motor MO, thereby advancing subscription card SC past writing head WH. Energization of lead 118 enables the readout of register REG$_3$ to converter DA for a recordal of any remaining credits on the subscription card by writing head WH, with cancellation of the original entries, whereupon the card is ejected from guide channel CR.

If a user deems the amount of prepayment credits on subscription card SC to be insufficient for covering projected conversation time, or if microcomputer MC warns the user via acoustic transducer FC or a blinking light on display D$_2$ that these credits are almost exhausted, the user may insert another subscription card SC' into guide channel CR, such insertion being communicated to microcomputer MC by sensor S$_3$ via lead 64. Upon collecting the last prepayment credit available on card SC, logic network LM receives from microcomputer MC on lead 113 a reading command causing the energization of motor MO and the consequent scanning of card SC' by head RH, subscription card SC being marked canceled before being ejected from the reader LS. The processing of card SC' proceeds as heretofore described with reference to card SC. Upon the completion of the telephone call and the ejection of this second card SC' by reader LS, logic network LM clears register REG$_1$ by a signal on a lead 119. Any malfunction will be reported to the microcomputer on lead 62.

Figure 4:
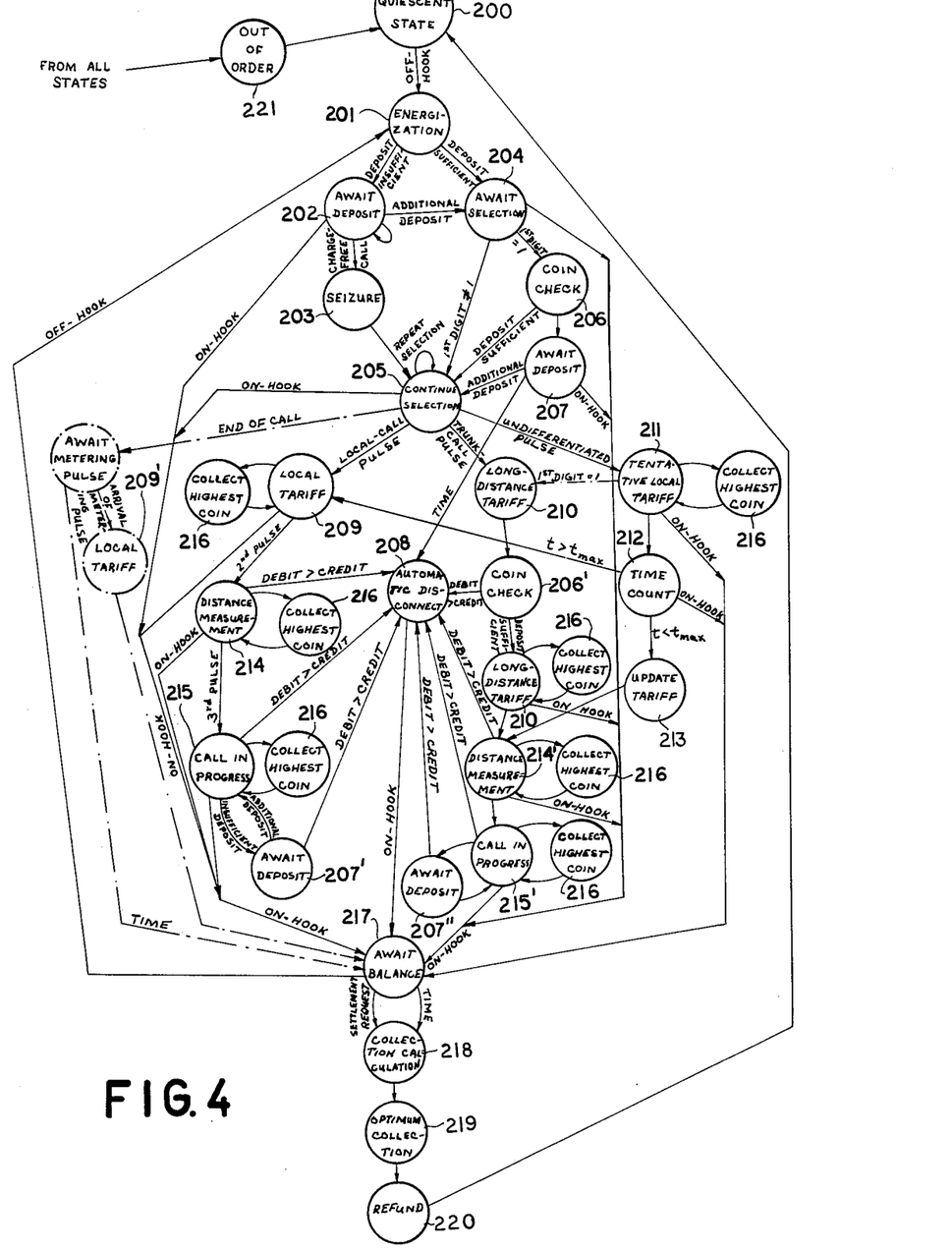
FIG. 4 is a flow chart illustrating the operation of the station shown in FIG. 1.

We shall now describe the operation of pay station AT with reference to FIG. 4. In the flow diagram of this Figure, as well as in the description thereof, the term "coin" is used to designate any monetary medium including also bills, tokens and prepayment credits.

Upon the lifting of handset MT from its hook, switch GA induces microcomputer MC to connect input 25 (FIG. 1) of supply AL to contact 23, as heretofore described. Processor CPU, switched from its quiescent state 200 to an active state 201 by this off-hook condition, clears its internal registers and begins to carry out the program stored in read-only memory ROM$_1$. The processor scans conductors 6c and 6e (FIG. 1) to determine whether any currency has been inserted in receptacle GE or whether a subscription card has been introduced into reader LS. If no money has been deposited, or if the amount is insufficient for even the shortest local call as determined by the processor according to information stored in memory ROM$_2$, microcomputer MC remains in a waiting state 202 and signals this condition to the user on display unit D$_2$ until the user either makes the necessary deposit or depresses key K$_1$ of keyboard TA provided for charge-free calls (e.g. emergency number 911). In the latter case, a seizure signal (state 203) is generated by a brief reversal of armature ga whereupon exchange EX sends dial tone and the caller may select the proper digits (state 205). Should he attempt to set up a different connection, the digits will not be forwarded and the call will be aborted.

If the deposited funds cover at least the basic charge for a local call, the processor switches to state 204 and again signals the exchange for the emission of dial tone. From the first digit or digits selected, the microcomputer MC determines whether the call is to be of the local or the long-distance (toll or trunk) type. In certain areas, trunk calls are characterized by a digit "0" or "1" in second position; elsewhere they are distinguished by an initial digit "1". For the sake of simplicity, the latter situation has been assumed in this description. We shall also assume that incoming metering pulses are differently weighted for local calls and for trunk calls, and that a basic charge (not necessarily identical) applies to both.

If the first digit is found to be different from 1, the system passes to the digit-transmission state 205. Otherwise, it goes to a state 206 for a determination whether the deposit suffices for the shortest-possible trunk call and, in the affirmative case, again moves on to state 205. In the absence of sufficient funds, the user is again invited (as by a blinking of display unit $D_2$) to make a supplemental deposit (state 207) and, if none is forthcoming, the call is aborted after a certain period (state 208); if the added deposit is made, state 205 is reached. At this point the digits already selected are transmitted to the exchange and, upon completion of the dialing operation, the connection is extended to the called subscriber. If that subscriber happens to be busy, the selection can be repeated by operation of key $K_2$ (FIG. 1).

When the called subscriber answers, metering pulses will be received by the processor at a rate dependent upon distance. In some areas, local calls involve only a single such pulse either at the beginning or at the end of conversation. If the exchange invariably sends a metering pulse upon the establishment of the connection, that pulse may differ in width according to the nature of the call; thus, the microcomputer may determine the applicable rate upon the arrival of the first pulse. In the event of a local-call pulse, the microcomputer applies the local tariff (state 209); if a trunk-call pulse is detected, the long-distance rate is established (state 210). If the first metering pulse is undifferentiated, the system changes initially to an interim state 211 but may switch to state 210 if the microcomputer has preserved the first digit ("1") identifying the connection as a trunk call. Otherwise, the local rate is applied in state 211 until the arrival of the second pulse, the time elapsed between the two pulses being measured (state 212). If the pulse interval t is greater than a predetermined time $t_{max}$, the call is considered local and the processor moves to state 209; if it is less, the processor moves to a state 213 to revise the applicable rate or tariff.

Since long-distance state 210 may have been reached on a deposit covering only local calls, it is necessary to have another check (state 206') for ascertaining whether sufficient funds are available. If not, the disconnect state 208 is established. If the deposit suffices, the arrival of the next metering pulse (state 210') will determine the length of conversation time for which money is available. Such a determination is also made from the updating state 213. If local cells are metered, the arrival of a second pulse causes a changeover from state 209 to a state 214 which is the equivalent of a state 214' reached from states 213 and 210'. The next-following pulse then sets a definite time limit for the call in progress (state 215 or 215') on the basis of the available funds. A premature disconnection can be staved off by an additional deposit (state 207' or 207"). Otherwise, the call is terminated by a shift to state 208 from any of states 210', 214, 214', 215, 215', 207', 207".

Processor CPU monitors conductors 6c and 6e and calculates, according to information stored in memory $ROM_2$, the total amount of currency and/or prepayment credits deposited in cash receptacle GE and reader LS, this total being communicated to the user via display unit $D_2$ which may also register the denomination of the largest uncollected payment item deposited in either of the two payment acceptors GE and LS. Upon the reception of each metering pulse, processor CPU updates the amount of credit shown on display unit $D_2$, transmits to exchange EX via generator GS and loop 1 a multifrequency-coded signal acknowledging the reception of a metering pulse and identifying for statistical purposes the type of call (whether local or long-distance), and possibly collects a highest-denomination payment item (coin, token, bill or prepayment credit) from one of these payment acceptors. If exchange EX receives no acknowledgment from station AT after emitting a second metering pulse, the station may be put out of service on account of possible failure or malfunction. Apparatus AT may also be deactivated by exchange EX in the absence of signals indicating the collection of payment within a predetermined time interval after the establishment of a connection and emission of at least one metering pulse by the exchange toward the apparatus AT. An out-of-service condition of apparatus AT is indicated to a user by display unit $D_2$ in response to a signal transmitted by processor CPU over output unit $U_2$ and lead 11c.

The microcomputer, having ascertained from the frequency of the incoming metering pulses the moment when the connection will have to be cut off for lack of further funds, alerts the caller (by actuating the acoustic transducer FS or a blinking light on display unit $D_2$) shortly before that time to the impending disconnection so that the necessary additional deposit can be made. Otherwise, the system goes to state 208 whenever the credit balance has dropped to less than the amount which would be due upon the arrival of the next metering pulse.

When in the course of a conversation the amount of the debt begins to exceed the value of the highest-denomination coin (or other payment item) on deposit, the emission of a collection command on the corresponding lead of multiple 11 causes the ingathering of such a payment item or the cancellation of a prepayment credit on a subscription card as described above, with or without modification of the information appearing on display unit $D_2$. If such a collection is not accompanied by a cutoff as discussed above, i.e. if sufficient funds remain on deposit, the conversation continues. We prefer, however, to subject these collections (represented by state 216 in FIG. 4) to certain limitations designed to preserve every option for a settlement most advantageous to the user. Such optimum settlement will not be prejudiced if the highest-ranking payment item is one of several of the same denomination, or if its value exceeds the combined value of all other payment items on deposit. If, however, an amount larger than this value could be attained by a combination of deposited payment items whose denominations are not submultiples of the denomination here considered, premature collection of the highest-denomination payment item may be disadvantageous to the caller. Thus, for example, a debt of 30 cents can be satisfied from a deposit of one quarter and three dimes by collecting only the latter, whereas a preceding collection of the quarter (when the debt reached 25 cents) would leave only dimes to pay for a 5-cent balance at the end of the conversation. The microcomputer, therefore, may be programmed to take into consideration the number of deposited payment items whose denominations do not bear a multiple/submultiple relationship.

Whenever the conversation terminates for any reason other than a malfunction, the system switches to a state 217 either from the disconnect state 208 or from other states if the receiver is rehooked. In an area where for a local call only a single metering pulse is generated at the end of that call, state 217 is reached via a state 218 and a state 209' establishing the applicability of the local rate.

With the processor in state 217, the user has the option of immediately unhooking to regain the initial state 201 for the placement of a further call or of pressing the key $K_3$ for the settlement of the debt and the refund of any excess deposit (state 218). The settlement procedure will also be started after a certain waiting period if the user fails to take either of these steps. The processor then determines the best mode of collection, i.e. the retention of just enough deposited and as yet uncollected funds to cover the charges incurred, as more fully described hereinafter (state 219). The balance is then refunded (state 220) whereupon the apparatus returns to its quiescent state 200. Such a return, from any other state, will also occur in the event of an out-of-order condition as represented by a state 221.

Figure 5:
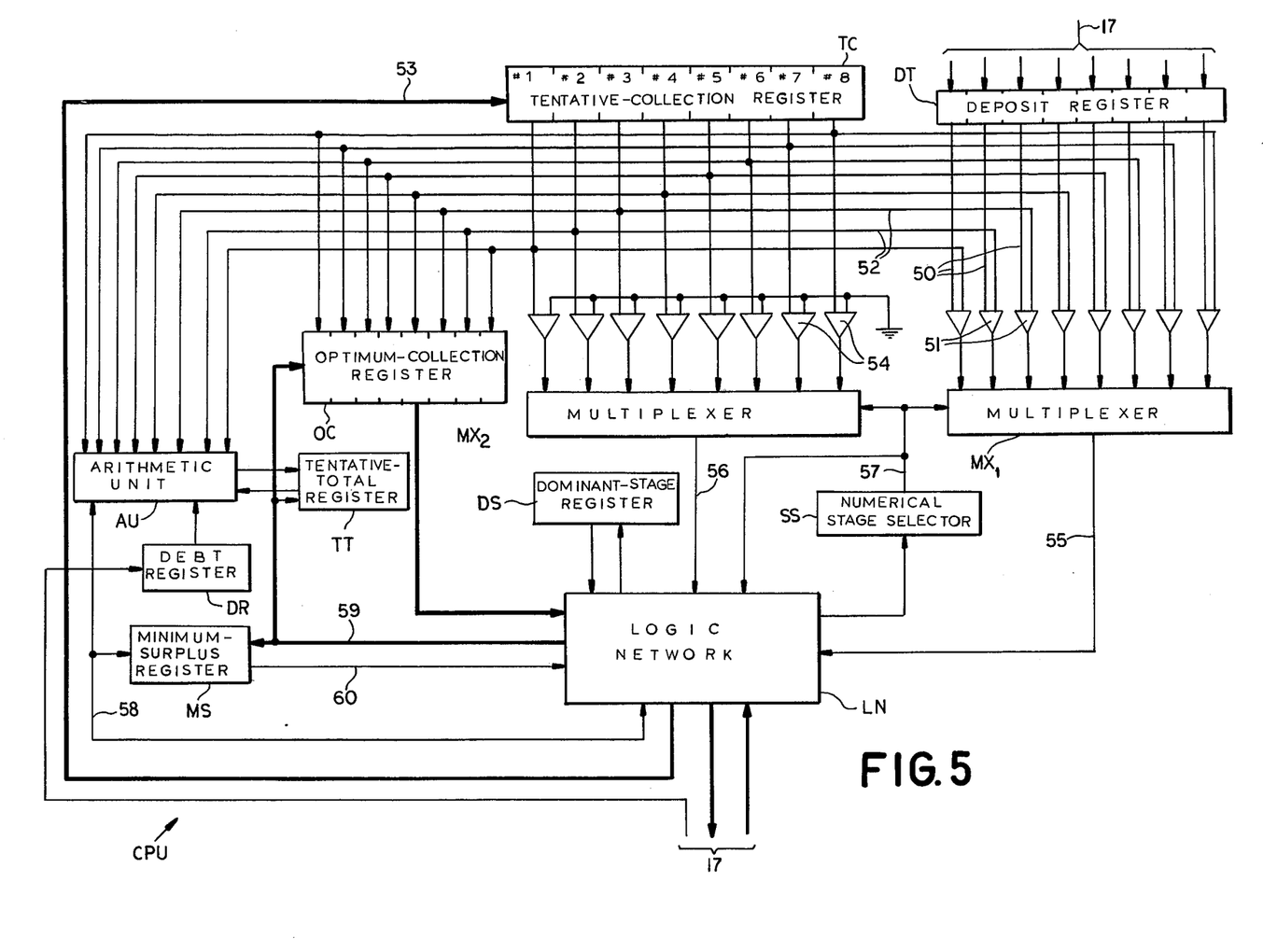
FIG. 5 is a block diagram of part of a processor shown in FIG. 1.

In FIG. 5 we have shown circuitry in processor CPU, controlled by a program stored in memory $ROM_2$ of FIG. 1, for calculating the optimal combination of payment items to be collected from among deposits in cash receptacle GE and reader LS for the cost of one or more telephone calls made from station AT. We shall assume, by way of example, that receptacle GE accepts currency in denominations of ten-dollar, five-dollar and one-dollar bills as well as quarters, dimes and nickels, in addition to tokens each valued at twenty-five dollars, and that reader LS accepts subscription cards carrying prepayment credits each worth two-and-a-half dollars. Thus, processor CPU includes an eight-stage register DT for storing in binary code the number of payment items deposited for any of these eight denominations. Each stage of register DT is individually served by a lead of microcomputer bus 17 for receiving deposit information from input unit $IN_2$ (FIG. 1); output leads 50 of the several stages of this register extend to respective comparators 51 working into a multiplexer $MX_1$. Comparators 51 have second input leads 52 originating at respective stages of a register TC which stores for each payment denomination, in response to up-counting and down-counting signals carried by a multiple 53 from a logic network LN, a tentative number of items to be collected, as described more fully hereinafter with respect to FIG. 6. Output leads 52 also go to eight further comparators 54 each having a grounded second input and an output lead terminating at a multiplexer $MX_2$. Multiplexers $MX_1$, $MX_2$ have output leads 55, 56 connected to network LN, the register stages explored by these multiplexers being determined by the setting of a numerical stage selector SS via a conductor 57 having a branch going back to network LN. Selector SS can be switched in an upshifting (leftward) or downshifting (rightward) sense by signals from logic network LN.

An arithmetic unit AU with inputs connected to register TC via leads 52 multiples the tentative number of payment items to be collected for each denomination, as stored in the several register stages, by the monetary value of the respective denomination and sums the results to obtain a tentative total which is then stored in register TT. A debt incurred for one or more telephone calls, as stored in a register DR with input connections to bus 17, is subtracted from the tentative total and the result is fed to network LN via a lead 58. If the tentative total exceeds the debt by an amount less than in any prior trial calculation, network LN enables via a mutiple 59 the loading of a register MS with the minimum-surplus information carried by lead 58 and the loading of another eight-stage register OC with signals transmitted from register TC over leads 52, the contents of register MS being fed to network LN via a lead 60. Thus, register OC stores an optimal number of payment items to be collected for each of the eight currency and subscription-card denominations accepted by pay station AT. A register DS stores the identity of the dominant stage of each trial calculation, i.e. a stage of register TC from which downshifting starts at the beginning of each trial as explained more fully hereinafter.

Figure 6:
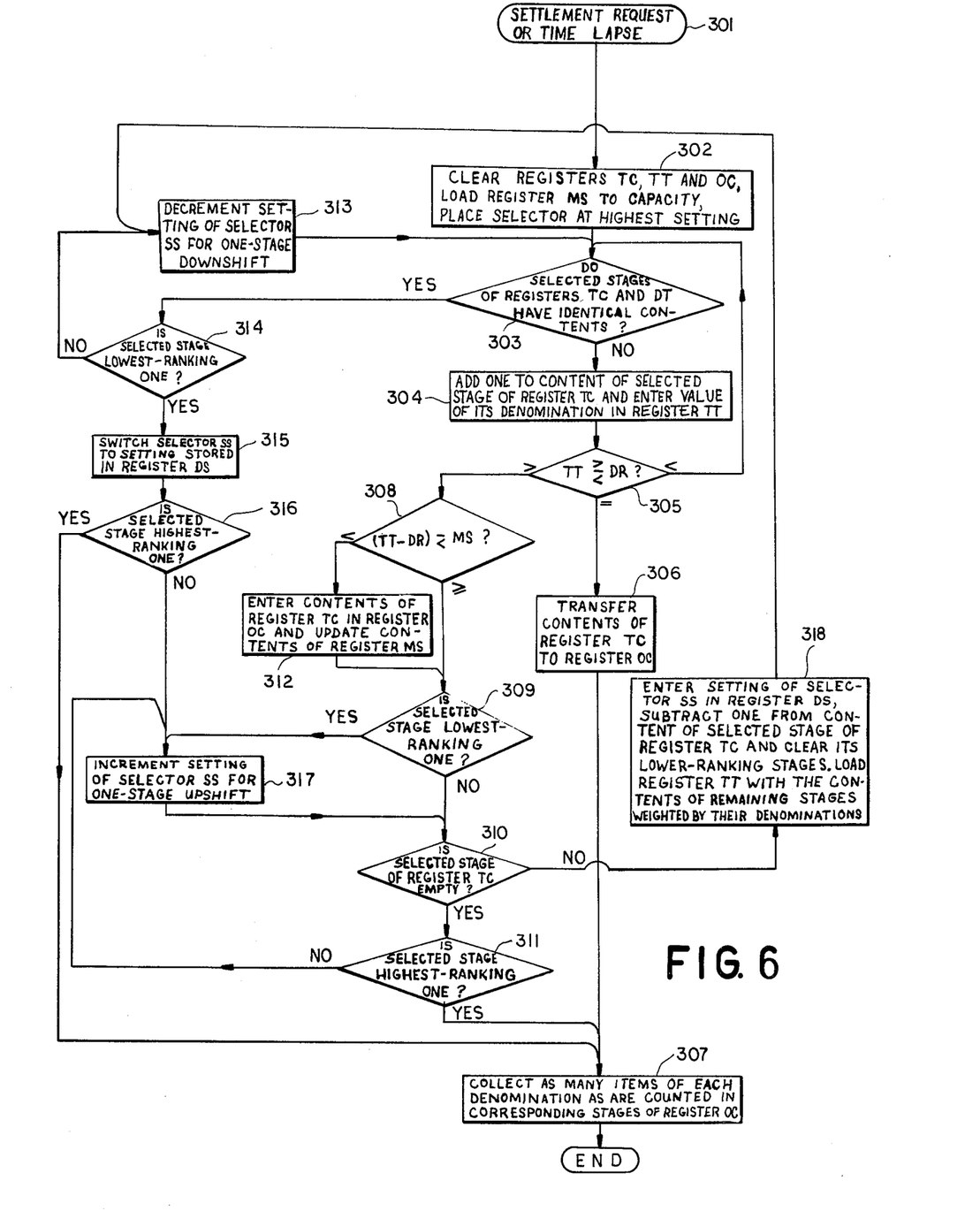
FIG. 6 is a flow chart illustrating in detail a collection-calculating procedure diagrammatically represented in FIG. 4.

With reference to FIG. 6 we shall now describe an algorithm used by microcomputer MC in determining, by a series of steps 301–318, an optimal combination of currency and subscription-card items to be collected as payment for one or more calls from station AT. As discussed above, processor CPU begins to determine this optimal combination upon receiving at the end of a call or series of calls a settlement request (FIG. 6, step 301) from a user or upon waiting a certain time after the reclosure of hook switch GA. During each trial calculation, network LN in a recurrent step 304 loads the register TC with a tentative count of payment items to be collected for a currency or subscription-card denomination, the monetary value of these items being entered by arithmetic unit AU in register TT. Calculation generally proceeds from left to right in the selection of stages of registers TC and DT, i.e. from the higher-ranking to the lower-ranking denominations, with the aid of one or more one-stage downshifts (step 313) as network LN decrements the setting of selector SS. Any trial calculation ends with step 305, if the total in register TT exceeds or equals the debt in register DR, or with step 314 if payment items of the lowest denomination deposited are all used up in the trial. If the total in register TT is found by arithmetic unit AU and network LN in step 308 to exceed the debt in register DR by an amount less than a minimum surplus determined in a prior trial and stored in register MS, network LN enables the loading of register MS with the data carried by lead 58, as heretofore described with reference to FIG. 9, and the payment items to be collected for each denomination, as stored in register TC, are entered in register OC by step 312 as an optimal comibination. If a trial terminates with unit AU calculating a tentative total exceeding the debt, the next trial begins with step 318 in which network LN subtracts one from the count of the selected dominant stage of register TC as identified by a numerical code read into register DS from selector SS by way of that network. If in step 309, however, processor CPU finds that the last stage explored represents the lowest denomination ($0.05), i.e. that selector SS has its minimum setting, then the next trial begins with the second-lowest denomination ($0.10), as determined in step 317 in which network LN increments the selector setting for a one-stage upshift. Upon the termination of a trial by exhausting the lowest denomination containing deposited payment items (step 314), processor CPU, in a sequence including steps 315, 316, 317, returns to a register stage assigned to the next-higher denomination having deposited items; if, however, in step 316 the number stored in register DS is found by network LN to represent the highest denomination ($25), the items designated by the contents of register OC are collected in final step 307 comprising the canceling of subscription-card prepayment credits and/or the gating of coins, tokens or bills into depositories in cash receptacle GE according to the optimal combination previously ascertained. Payment is also collected if unit AU and network LN determine in step 305 that there is equality between a total stored in register TT and the debt stored in register DR, i.e. that a zero surplus exists, the contents of the eight stages of register TC being then transferred in step 306 to respective stages of register OC. If an upshift is necessary to re-establish a dominant stage previously explored (step 317), logic network LN checks in step 310 whether that stage still has a non-zero content so that its count can be diminished by one. If this is the case, as determined by the absence of an output signal on lead 56 in FIG. 5, network LN proceeds to step 318; otherwise, the network explores the next-higher denomination by another upshift (step 317), or proceeds to the final step 307 in the event that the stage just examined is assigned to the highest denomination ($25) as determined in step 311. An initial step 302 preceding the first trial calculation includes the clearing of all eight stages of registers TC and OC, the setting of register MS to its highest reading, the clearing of register TT, and the switching of selector SS to its maximum setting corresponding to the leftmost stages of registers TC and DT. After the initial step 302, and upon any subsequent trial, logic network LN enters a loop comprising steps 303–305, step 303 consisting of a check as to whether the count stored in the stage of register TC identified by selector SS is equal to the number of payment items deposited for this denomination, as stored in register DT. If this is so, multiplexer $MX_1$ energizes its output lead 55 to inform the logic netowrk that the count in the corresponding stage of register TC cannot be increased any further.

Figure 7:
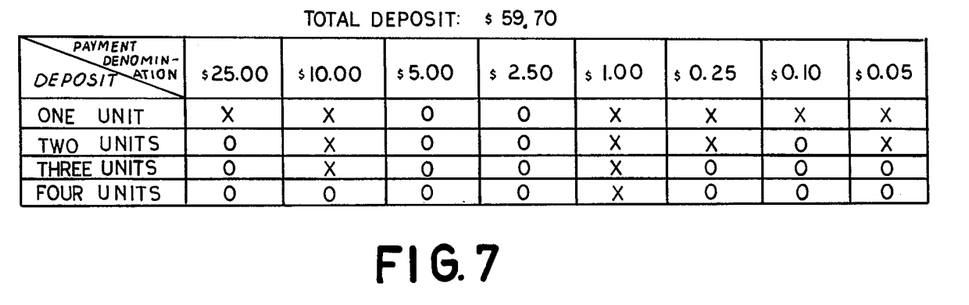
FIG. 7 is a table showing, by way of example, a combination of payment items deposited by a user.

Examples illustrating the operation of processor CPU according to the flow chart of FIG. 6 will now be described with reference to FIGS. 7–9. As indicated in FIG. 7, we shall assume that a caller engaged in, say, a transatlantic conversation has fed three $10 bills and four $1 bills to the paper-money acceptor of cash receptacle GE and has deposited a token worth $25, two quarters, one dime and two nickels in corresponding chutes 101 (FIG. 2) of that receptacle. The total of $59.70 is displayed on unit $D_2$, as is the accumulated debt which in the example of FIG. 7 is assumed to be $33.45. (For the reasons already explained, the item of $25 has remained uncollected to the end in view of the presence of the three $10 bills; an additional token may, however, have been collected before, thereby reducing the final debt by a like amount to the total here considered.)

With registers TC, TT and OC cleared in step 302, and with multiplexers $MX_1$, $MX_2$ standing on their extreme left-hand inputs, logic network LN loads the first stage of register TC with a count of 1 in step 304 after determining in step 303 that the content of that stage differed from that of the corresponding stage of register DT reflecting the presence of one item in the first column of FIG. 7. This count, weighted by the denominational value of $25, is also entered in register TT but is found (step 305) to be less than the debt stored in register DR. Processor CPU, therefore, returns to step 303 which now, with equality in the contents of the leftmost (No. 1) stages of registers TC and DT, leads to step 314 and thence to step 313 with resulting downshift to the second stage of register TC assigned to the $10 denomination. A return to step 303 again shows inequality between the contents of this stage and of the corresponding stage of register DT, causing a count of 1 to be entered in the No. 2 stage of register TC and an augmentation of the total in register TT by $10. When this total is compared with the debt in step 305, a surplus of $1.55 is found to exist as shown in the top row of FIG. 8.

With register MS loaded to capacity up to this point, the comparison carried out in step 308 results in the entry of that surplus in this register and the nondestructive readout of the contents of register TC to register OC (step 312) whereupon the decisions made in steps 309 and 310 bring on step 318 with entry of the setting of selector SS (i.e. an identification of the $10 stage) in dominant-stage register DS. Logic network LN now subtracts one from the content of that stage of register TC, thus reducing its count to zero. Next, in step 313, the setting of selector SS is decremented for another downshift to the No. 3 stage of register TC without, however, changing the designation of the dominant stage in register DS. Since the $5 column of FIG. 7 contains no deposit, the No. 3 stages of registers TC and DT are found to have the same contents (0) in step 303 so that the processor reverts to step 314. As the $1 column of FIG. 7 is also empty, loop 314, 313, 303 is traversed two more times with a downshift to the No. 5 stage of register TC assigned to the $1 denomination. The processor now returns to step 304 in which a count of 1 is written in that register stage and the total stored in register TT is augmented by the denominationally weighted value of that count, i.e. $1. Since this total is found insufficient in step 305, there occur three more traverses of loop 303, 304, 305 with no change in the selector setting. On the last traverse, there is still a shortfall with resulting reversion to step 303 and (as the supply of $1 items is now exhausted) traverse of loop 314, 313, 303 with a further downshift to the No. 6 stage. As the corresponding stage of register DT lists the two 25-cent pieces shown in the sixth column of the table of FIG. 7, loop 303, 304, 305 is traversed twice to enter a count of 2 in the No. 6 stage of register TC and augment the total of register TT by the corresponding amount of $0.50, again with unsatisfactory results. A further looping through steps 314, 313, 303 brings a downshift to the No. 7 stage and is followed by one pass through steps 304, 305, loading of the No. 7 stage with a count of 1 and incrementation of the contents of register TT by $0.10. Since the total is still less than the debt stored in register DR, there occurs a final downshift to the No. 8 stage, entry of a count of 2 in that stage and augmentation of the total by $0.10. This trial calculation produces a deficit of $3.75 as shown in the second row of FIG. 8.

Since the register stage last examined is the lowest-ranking one, the system switches from step 314 to step 315 which causes a resetting of selector SS and a return of multiplexers $MX_1$, $MX_2$ to their No. 2 position, in conformity with the dominant-stage designation of register DS. There follows a determination, in step 316, that the stage in question is not the highest-ranking one so that the processor passes on to step 317; this causes an upshift to the No. 1 stage which in step 310 is found not to be empty since it still contains a count of 1. Once again, therefore, step 318 is reached in which the lastmentioned count is reduced to zero while the No. 1 stage is identified in register DS as the dominant one for the trial to follow.

This third trial begins with a return to step 313 and a downshift to the No. 2 stage of register TC which is now loaded with a count of 3 in three consecutive traverses of loop 303, 304, 305, with concurrent inscription of a total of $30 in register TT. As this amount is less than the debt, the system passes three times through the downshift loop 314, 313, 303 to reach the next denomination in which a deposit is available, i.e. the No. 5 stage. After four traverses of the tentative-collection loop 303, 304, 305, this No. 5 stage contains a count of 4 and the amount stored in register TT is $34, with a surplus of $0.55 as shown in the third row of FIG. 8. Since this surplus is less than the one entered in register MS after the first trial, the decision made in step 308 brings about an updating (step 312) of the contents of this register as well as of register OC before the processor passes on to steps 309, 310 and 318. Step 318 loads register DS with the last setting of selector SS, making stage No. 5 the dominant one for the fourth trial which starts with the contents of that stage reduced to a count of 3.

Figure 8:
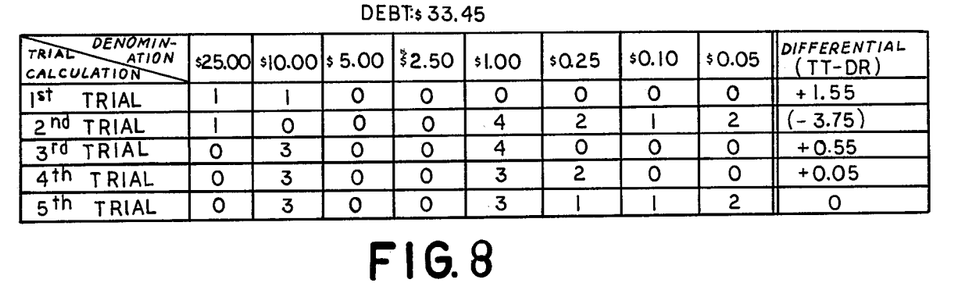
FIG. 8 is a table giving an example of a series of trial calculations by the system of FIG. 1, according to the flow chart of FIG. 6, for determining an optimum subcombination of payment items to be collected from the deposit indicated in FIG. 7.

After a downshift to the No. 6 stage in step 313, two traverses of loop 303, 304, 305 are needed to load that stage with a count of 2 and accumulate a total of $35.50 which creates a surplus of $0.05, entered (step 312) in register MS since it is less than the amount previously inscribed therein; see fourth row of FIG. 8. The processor then passes through steps 309, 310 and 318, causing entry of the No. 6 stage in register DS and reduction of its content to a count of 1 while the lower-ranking stages Nos. 7 and 8 are cleared. After two further downshifts, involving a simulated collection of the dime and the two nickels on deposit, the No. 7 and No. 8 stages of register TC contain a count of 1 and 2, respectively, and the total stored in register TT is $33.45, precisely matching the debt as indicated in the bottom row of FIG. 8. The system thus proceeds from step 305 to step 306, causing transfer of the contents of register TC to respective stages of register OC, and ends the proceedings with step 307 in which the items represented by the entries in that register are actually collected.

Figure 9:
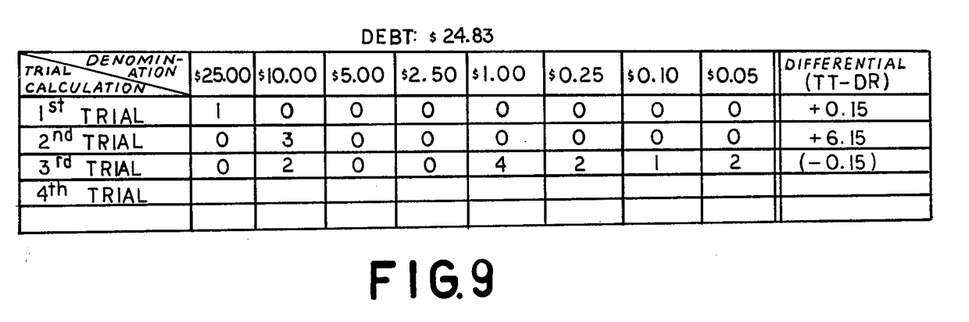
FIG. 9 is a table similar to that shown in FIG. 8 but representing a different example.

FIG. 9 represents another example, based on the deposits of FIG. 7 and assuming a debt of $24.83. Since the apparatus is assumed not to accept pennies, the microcomputer rounds up the amount to the nearest nickel so that register DR stores a sum of $24.85. On the first trial, the loading of the No. 1 stage of register TC with a count of 1 (corresponding to the $25 item available) produces a surplus of $0.15 as shown in the top row of FIG. 9. When step 318 is reached in the aforedescribed manner, after inscription of that surplus in register MS (step 312), the identity of this stage is written into register DS and its count is reduced to zero, with a downshift to the No. 2 stage and entry of a count of 3 in that stage. The resulting surplus of $6.15 (second row of FIG. 9) exceeds the one from the preceding trial, stored in register MS, so that step 312 is bypassed in the return to step 318. There the count of stage No. 2 is reduced to 2 whereupon successive downshifts bring about the result shown in the bottom row of FIG. 9, i.e. the loading of the Nos. 5, 6, 7 and 8 stages with counts of 4, 2, 1 and 2, respectively, thus simulating a depletion of all the lower-ranking denominations. This still leaves a shortfall of $0.15 and generates the aforedescribed sequence of steps 303, 314, 315, 316; since the stage entered in register DS in step 315 is the highest-ranking one as determined in step 316, the trials are terminated as the processor passes to the collection step 307. The optimum-collection register OC, loaded at the end of the first trial in conformity with the contents of register TC, reads out only a count of 1 from the first stage so that the $25 token is collected in this step; the payment, therefore, exceeds the rounded-up debt by $0.15.

Inasmuch as the amount of the debt and the available deposits are displayed by unit $D_2$, the caller has an opportunity to improve the collection procedure in his favor by making a suitable additional deposit before pressing the settlement-request key $K_3$ or letting the system pass to the calculation state 218 of FIG. 4. In the case of FIG. 9, an insertion of another nickel and another dime would have brought the total of the third trial to the exact amount of the debt shown in register DR, thus saving the user the collected excess of $0.15.

Deposit register DT and debt register DR (or other, similar registers in processor CPU) are also used in earlier phases of operation to store the data relating to the available deposits and the accumulated charges. Arithmetic unit AU, receiving these data in response to instructions read out from memory $ROM_2$, performs the various calculations described with reference to FIG. 4 to generate collection or disconnect commands, and to predict the time when the deposits will equal the debt in order that the processor may alert the caller to an impending disconnection by means of unit $D_2$ or FC as described above.

The reading of register DR is, of course, increased upon the arrival of a metering pulse and reduced with every collection. The contents of the several stages of register DT are also updated after every deposit and every collection. From these latter contents the arithmetic unit AU ascertains the identity of the stage representing the highest-denomination payment item on deposit; unit AU may also compare the value of this highest-denomination item with the contents of a lower-ranking stage whose denomination is not a submultiple of the one just considered, in order to determine whether collection of this highest-denomination item (if it is the only one of its rank) would be prejudicial to optimum collection as discussed above. Thus, in the example given with reference to FIG. 8, premature collection of the $25 item would have prevented an exact settlement of the balance and would have caused a loss of $1.55 to the caller, at least in the absence of an additional deposit in the form of a $5 bill.

If handset MT (FIG. 1) is removed from apparatus AT, if coins are blocked within a chute 101 (FIG. 2) or if clock CK stops, microcomputer MC alerts exchange EX by opening the switch LSC. Because the consequent interruption of current flow in loops 1' and 2' cannot be overcome by the reversal of switches $SW_1$, $SW_2$, the exchange is able to distinguish current interruption due to the opening of switch LSC from interruptions due to the manipulation of switch ga. Failure in the operation of microcomputer MC is also communicated to exchange EX by the opening of switch LSC, this failure being detected by a circuit monitor such as a monoflop recurrently tripped during normal operation of microcomputer MC.

Multifrequency signals generated by unit GS on loop 1 generally comprise a combination of two frequencies each chosen from a group of four frequencies. Such multifrequency combinations produced by generator GS under the control of microcomputer MC include signals acknowledging the reception of charging pulses and coding the type of call, signals confirming the collection of coins, bills or tokens by receptacle GE or of prepayment credits by reader LS, a signal informing the exchange EX of the forthcoming transmission of a selected call number over loop 2, and alarm signals indicating failure of payment collection, a full or absent depository 131 (FIG. 2), a disabled card reader LS (FIGS. 1 and 3) or an unlocked apparatus casing (not shown). Some of the alarm signals informing the exchange EX of malfunctions of the pay-station equipment must be manually terminated while others may cease automatically upon removal of their causes. The signal reporting improper operation of the collection mechanism, for example, may be stopped after a certain time interval.

Station AT may be put out of service, through a cutoff of its power supply, by the associated exchange EX if the latter detects an irregularity such as, for instance, the nonarrival of an acknowledgment of a metering pulse within a specified period from its emission.

Read-only memory $ROM_3$ may be plugged in by maintenance personnel, during execution by microcomputer MC of a principal program stored in memory $ROM_1$, to carry out an ancillary program reading out the contents of the registers of FIG. 5 (and other registers included in processor CPU) to display unit $D_1$ for checking purposes.

We claim:

1. In a telephone pay station provided with voice-communication equipment and with selection means for transmitting call-number digits to an associated exchange preparatorily to the establishment of a talking connection via said voice-communication equipment, in combination:
   payment-accepting means accommodating deposits of monetary media including payment items of different denominations;
   sensing means at said payment-accepting means for detecting the number of deposited payment items of each denomination;
   money-handling means at said payment-accepting means for selectively collecting payment items of any denomination and refunding uncollected deposited payment items to a user; and
   computing means including a processor for controlling the collection of deposited payment items in response to metering pulses from the exchange and for refunding any remaining balance to the user upon the termination of a talking connection, said processor comprising first register means for storing a debt accumulated from charges based on said metering pulses, second register means controlled by said sensing means for storing the number of deposited payment items of any denomination, disconnect means for cutting off a talking connection upon said debt reaching the sum of the monetary values of the deposited payment items, logical circuitry operative upon a termination of a talking connection other than through cutoff by said disconnect means for establishing different subcombinations of the contents of said second register means, arithmetic means connected to said logical circuitry for calculating the difference between said debt and the total value of the payment items represented by any of said subcombinations, and signaling means controlled by said arithmetic means for actuating said money-handling means to collect payment items corresponding to an optimum subcombination for which said total value exceeds said debt by a nonrefundable surplus ranging from zero to the smallest surplus obtained with any other subcombination established by said logical circuitry.

2. The combination defined in claim 1 wherein said computing means further includes memory means for the storage of minimum charges relating to different types of connections identified by initial call-number digits, said arithmetic means being operable to prevent the transmission of further call-number digits to said exchange in the absence of a reading of said second register means indicative of a deposit sufficient to cover the applicable minimum charge.

3. The combination defined in claim 2 wherein said selection means comprises a keyboard with a key operable to set up a charge-free call.

4. The combination defined in claim 1, 2 or 3, further comprising warning means controlled by said arithmetic means for alerting the user to an impending cutoff upon said debt approaching said sum.

5. The combination defined in claim 1 wherein said money-handling means is actuatable by said signaling means to collect, prior to termination of a talking connection, a highest-denomination deposited payment item upon the value thereof being exceeded by said debt with corresponding reduction of the contents of said first and second register means.

6. The combination defined in claim 1, 2 or 5, further comprising display means connected to said processor for visually indicating said debt and the deposited monetary values to the user throughout the existence of a talking connection, said logical circuitry being operable with a delay enabling the user to deposit additional payment items after termination of a talking connection to minimize the nonrefundable surplus included in said optimum subcombination.

7. The combination defined in claim 6, further comprising user-operated means for activating said logical circuitry upon a termination of a talking connection, and timing means for activating said logical circuitry independently of said user-operated means after a predetermined waiting period commencing with said termination.

8. The combination defined in claim 1, 2 or 5 wherein said payment-accepting means includes a subscription-card reader and a cash receptacle.

9. The combination defined in claim 1, 2 or 5, further comprising ancillary memory means connectable to said computing means for testing the operation of said processor, and indicator means for revealing the results of the tests.

10. The combination defined in claim 1, 2 or 5 wherein said processor further comprises third register means for temporarily storing a set of tentative counts of deposited payment items representing one of said subcombinations and fourth register means for receiving the contents of said third register means upon identification thereof as a representation of said optimum subcombination.

11. The combination defined in claim 10 wherein said processor further comprises fifth register means for temporarily marking a dominant stage of said third register means, assigned to a selected domination, whose tentative count is to be reduced in the event of a surplus of the represented subcombination over said debt, said logical circuitry being operative to load at least one stage of said third register means ranking below said dominant stage to establish a different set of counts representative of another subcombination.

12. The combination defined in claim 11 wherein said processor further comprises sixth register means for storing the surplus resulting from any of said subcombinations for comparison with a possible surplus from a subsequently established subcombination to find said optimum subcombination.

* * * * *